United States Patent
Payne et al.

(10) Patent No.: US 9,701,244 B2
(45) Date of Patent: Jul. 11, 2017

(54) SYSTEMS, METHODS, AND VEHICLES FOR GENERATING CUES TO DRIVERS

(71) Applicant: Toyota Motor Engineering & Manufacturing North America, Inc., Erlanger, KY (US)

(72) Inventors: Joshua D. Payne, Irvine, CA (US); Vincent E. Roa, Arcadia, CA (US); Lincoln Morfin, Long Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/868,776

(22) Filed: Sep. 29, 2015

(65) Prior Publication Data

US 2017/0088049 A1  Mar. 30, 2017

(51) Int. Cl.
*B60Q 9/00* (2006.01)
(52) U.S. Cl.
CPC .................. *B60Q 9/00* (2013.01)
(58) Field of Classification Search
CPC ... B60Q 9/00; B60W 10/18; B60W 30/18018; B60W 30/18072; B60W 30/181; B60W 30/18154; B60W 2540/12; B60W 2550/20; B60W 2550/22; B60T 7/12; B60T 7/18; B60L 2260/24; F16H 2059/186; F16H 2061/0015; Y02T 10/48
USPC ..... 340/425.5, 435, 436, 438, 439, 441, 457
See application file for complete search history.

(56) References Cited

U.S. PATENT DOCUMENTS

| | | | |
|---|---|---|---|
| 6,226,571 B1 | 5/2001 | Kai | |
| 6,968,266 B2 | 11/2005 | Ahmed-Zaid et al. | |
| 8,260,538 B2 | 9/2012 | Noda et al. | |
| 8,983,706 B2 | 3/2015 | Hartmann et al. | |
| 2011/0054768 A1* | 3/2011 | Sullivan | B60W 10/06 701/123 |
| 2011/0307122 A1* | 12/2011 | Kanning | B60W 30/18072 701/1 |
| 2012/0095670 A1* | 4/2012 | Piggott | F02D 17/04 701/112 |
| 2012/0303222 A1* | 11/2012 | Cooprider | B60W 10/06 701/48 |

(Continued)

FOREIGN PATENT DOCUMENTS

EP   2862768   4/2015

*Primary Examiner* — Brian Wilson
(74) *Attorney, Agent, or Firm* — Dinsmore & Shohl LLP (57) ABSTRACT

Systems, methods and vehicles for generating cues to drivers of vehicles are disclosed. A system for generating a cue to a driver of a vehicle including at least one processor, at least one memory module communicatively coupled to the at least one processor, at least one stop (S) stored in the at least one memory module and at least one object sensor communicatively coupled to the at least one processor. When executed by the at least one processor, the machine readable instructions cause the cue generating system to detect a presence of an object in front of the vehicle, determine a cue position ($P_{cue}$) for generating a cue based on the detected presence of the object and the stop (S), and generate the cue to a driver of the vehicle based on the first position and the cue position ($P_{cue}$).

20 Claims, 4 Drawing Sheets

(56) References Cited

U.S. PATENT DOCUMENTS

2014/0104050 A1     4/2014   Kuroba et al.
2015/0232099 A1*    8/2015   Miller .................. B60T 7/18
                                                        701/70

* cited by examiner

SYSTEMS, METHODS, AND VEHICLES FOR GENERATING CUES TO DRIVERS

TECHNICAL FIELD

Embodiments described herein generally relate to systems, methods, and vehicles for generating cues to drivers. Specifically, the embodiments relate to systems, methods, and vehicles for generating cues to drivers at cue positions that are determined based on a previous stop and the presence of an object in front of the vehicle.

BACKGROUND

Vehicles may provide a variety of cues to drivers in order to alert drivers to various driving conditions. It is desirable to provide drivers with cues to change the way in which they drive in order to enhance fuel economy.

SUMMARY

In one embodiment, a system for generating a cue to a driver of a vehicle includes at least one processor, at least one memory module communicatively coupled to the at least one processor, and at least one stop (S) stored in the at least one memory module. The at least one stop (S) is a location at which the vehicle has previously stopped. The system further includes at least one object sensor communicatively coupled to the at least one processor. When executed by the at least one processor, the machine readable instructions cause the system to detect a presence of an object in front of the vehicle based on an output of the at least one object sensor, determine a cue position ($P_{cue}$) for generating the cue based on a detected presence of the object and the at least one stop (S), determine a first position of the vehicle, and generate the cue to the driver of the vehicle based on the first position and the cue position ($P_{cue}$).

In another embodiment, a method for generating a cue to a driver of a vehicle includes storing at least one stop (S) in at least one memory module. The at least one stop (S) is a position at which the vehicle has previously stopped. Further, the method includes detecting a presence of an object in front of the vehicle based on an output of the at least one object sensor, determining a cue position ($P_{cue}$) for generating the cue based on the detected presence of the object and the at least one stop (S), determining a first position of the vehicle, and generating the cue to the driver of the vehicle based on the first position and the cue position ($P_{cue}$).

In yet another embodiment, a vehicle including a system for generating a cue to a driver of the vehicle includes at least one processor, at least one memory module communicatively coupled to the at least one processor, and at least one stop (S) stored in the at least one memory module. The at least one stop (S) is a location at which the vehicle has previously stopped. The system further includes at least one object sensor communicatively coupled to the at least one processor. When executed by the at least one processor, the machine readable instructions cause the system to detect a presence of an object in front of the vehicle based on an output of the at least one object sensor, determine a cue position ($P_{cue}$) for generating the cue based on a detected presence of the object and the at least one stop (S), determine a first position of the vehicle, and generate the cue to the driver of the vehicle based on the first position and the cue position ($P_{cue}$).

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems, methods, and vehicles for generating cues to drivers at cue positions that are determined based on a previous stop and the presence of an object in front of the vehicle. Referring generally to FIG. 3B, a method for generating a cue to a driver of a vehicle includes storing at least one stop (S) in at least one memory module. The at least one stop (S) is a position at which the vehicle has previously stopped. Further, the method includes detecting a presence of an object in front of the vehicle based on an output of the at least one object sensor, determining a cue position ($P'_{cue}$) for generating the cue based on the presence of the object detected and the at least one stop (S), determining a first position of the vehicle, and generating the cue to the driver of the vehicle based on the first position and the cue position ($P_{cue}$).

The cue given to the driver of the vehicle at the cue position ($P_{cue}$) is an indication to the driver to begin coasting (i.e. to remove his or her foot from the accelerator pedal) at the cue position ($P_{cue}$). By providing a cue to begin coasting, regenerative braking may be enhanced and fuel economy may be improved. Furthermore, when an object, such as another vehicle is detected in front of the vehicle, the cue position may be adjusted to account for the object (i.e. by providing the cue sooner when the object is detected to take into account the adjusted stop necessitated by another vehicle in front), thereby providing enhanced regenerative braking and improved fuel economy compared to systems that do not account for objects in front of the vehicle when determining cue positions, which may provide cues too late and lead to smaller improvements in regenerative breaking and fuel economy.

Figure 1:
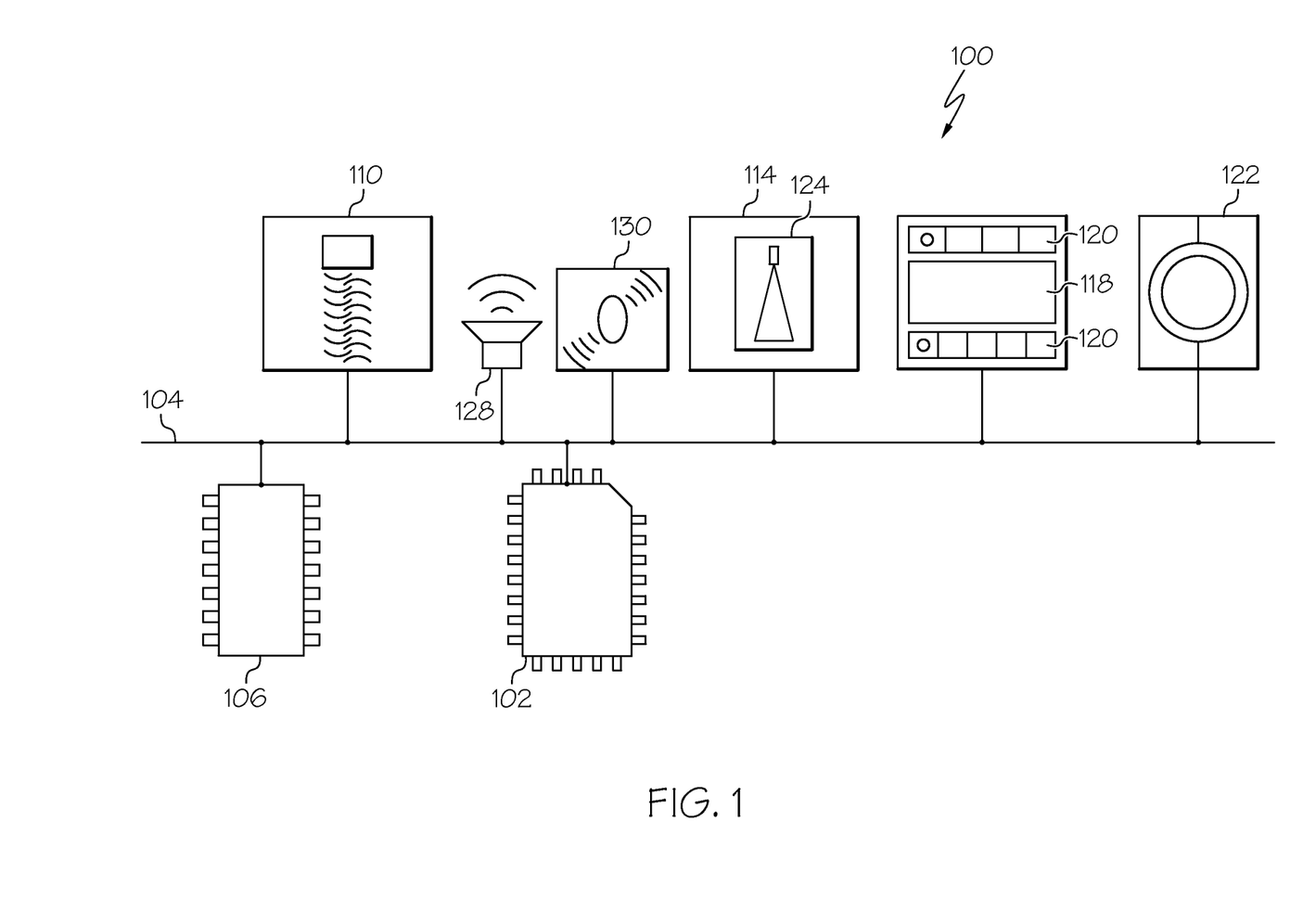
FIG. 1 depicts a system for generating a cue to a driver of a vehicle, and its various components, according to one or more embodiments shown and described herein.

Referring to FIG. 1, an embodiment of a cue generating system 100 is schematically depicted. It is noted that while the system is depicted in isolation, the system 100 can be coupled to a vehicle (e.g. the vehicle 300 shown in FIGS. 3A and 3B). In some embodiments, one or more components of the system 100 may be embedded within a mobile device (e.g. smartphone, laptop computer etc.) carried by a driver of the vehicle. The cue generating system 100 includes at least one processor 102, a communication path 104, at least one memory module 106, at least one object sensor 110, a navigation module 114, a display 118, tactile input hardware 120, a peripheral tactile input 122, a satellite antenna 124, a sound system 128 and a tactile feedback device 130, each of which will now be described in greater detail.

The cue generating system 100 includes at least one processor 102. The at least one processor 102 may be any device capable of executing machine readable instructions. Accordingly, the at least one processor 102 may be a controller, an integrated circuit, a microchip, a computer or any other computing device. The at least one processor 102 is coupled to a communication path 104 that provides signal interconnectivity between various components of the system 100. Accordingly, the communication path 104 may communicatively couple any number of processors with one another, and allow the various components coupled to the communication path 104 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Moreover, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The cue generating system 100 includes at least one memory module 106 coupled to the communication path 104. The at least one memory module 106 may comprise RAM, ROM, flash memories, hard drives, or any device capable of storing machine readable instructions such that the machine readable instructions can be accessed by the at least one processor 102. The machine readable instructions may comprise logic or algorithm(s) written in any programming language of any generation (e.g., 1GL, 2GL, 3GL, 4GL, or 5GL) such as, for example, machine language that may be directly executed by the at least one processor 102, or assembly language, object-oriented programming (OOP), scripting languages, microcode, etc., that may be compiled or assembled into machine readable instructions and stored on the at least one memory module 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the at least one memory module 106 may include information pertaining to previously traveled routes to various destinations. For example, the at least one memory module 106 may also be configured to store the at least one stop (S) made on previously traveled routes. The at least one stop (S) is a location at or around which the vehicle has previously stopped. The at least one stop (S) may be a temporary stop made en-route to a final destination. A temporary stop is a location at which the vehicle comes to a complete halt, and after halting for a period of time, continues towards its final destination. Examples of such stops (S) occur at a stop sign, a traffic sign or the like.

Additionally, the at least one memory module 106 is also configured to store at least one stopping position ($S_n$) near a stop (S). The at least one stopping position ($S_n$) is a position at which the vehicle has previously stopped prior to reaching the at least one stop (S). In some embodiments, the at least one stopping position ($S_n$) is within a distance ($D_S$) from the at least one stop (S). In one embodiment, the cue generating system 100 may be configured to store the at least one stopping position ($S_n$) as the position at which the vehicle stopped the last time that route was traveled. In another embodiment, the cue generating system 100 may be configured to store the stopping position ($S_n$) as the most frequent position the vehicle stops at when the vehicle approaches the at least one stop (S). Once the at least one stopping position ($S_n$) is stored, the cue generating system 100 may be configured to retrieve the at least one stopping position ($S_n$) in response to the vehicle being at/within a minimum threshold distance ($D_o$) from the at least one stop (S). In certain embodiments, the at least one memory module 106 may also be configured to store driving behavior of a driver. For example, the average driving speed, braking frequency, and such behavioral information may be stored.

Still referring to FIG. 1, the cue generating system 100 further includes at least one object sensor 110 which is communicatively coupled to the at least one processor 102. The at least one object sensor 110 is used to detect the presence of an object in front of the vehicle. In some embodiments, the at least one object sensor 110 may also be configured to detect the presence of an object on the side of, or behind the vehicle. In embodiments, the at least one object sensor 110 is configured to detect the presence of an object when the vehicle is within a minimum threshold distance ($D_o$) of the at least one stop (S).

The at least one object sensor 110 shown in FIG. 1 may be placed anywhere on the vehicle. In embodiments, the at least one object sensor 110 is placed on the front of the vehicle around the radiator grille or bumper. In other embodiments, the at least one object sensor 110 may be placed in other locations such as on the rear bumper, the side of the vehicle, or within the vehicle. The at least one object sensor 110 may be a radar unit, an ultrasonic unit, a camera system, a laser unit, or a laser radar unit.

As shown in FIG. 1, the cue generating system 100 also includes a navigation module 114. The navigation module 114 is configured to obtain and update positional information of the vehicle. The navigation module 114 may be able to obtain and update positional information based on geographical coordinates, i.e. latitudes and longitudes, or via electronic navigation where the navigation module 114 electronically receives positional information through satellites. In certain embodiments, the navigation module 114 may be a GPS system.

The navigation module 114 depicted in FIG. 1 includes a satellite antenna 124. In embodiments, the satellite antenna 124 is coupled to the communication path 104 such that the communication path 104 communicatively couples the satellite antenna 124 to other modules of the cue generating system 100. The satellite antenna 124 is configured to receive signals from global positioning system satellites. Specifically, in one embodiment, the satellite antenna 124 includes one or more conductive elements that interact with electromagnetic signals transmitted by global positioning system satellites. The received signal is transformed into a data signal indicative of the location (e.g., latitude and longitude) of the satellite antenna 124 or an object positioned near the satellite antenna 124, by the at least one processor 102.

While the embodiment depicted in FIG. 1 includes the navigation module 114 having the satellite antenna 124 as a separate component, other embodiments may not include a separate navigation module 114 or satellite antenna 124.

Referring still to FIG. 1, the cue generating system 100 comprises a display 118 for providing visual output such as, for example, maps, navigation, entertainment, information, or a combination thereof. The display 118 is coupled to the communication path 104. Accordingly, the communication path 104 communicatively couples the display 118 to other modules of the system 100. In some embodiments, the display 118 may include any medium capable of transmitting an optical output such as, for example, a cathode ray tube, light emitting diodes, a liquid crystal display, a plasma display, or the like. In some embodiments, the display 118 is configured to output the cues described herein. In some embodiments, the display 118 provides information regarding an object detected by the at least one object sensor 110, such as when the display 118 indicates the presence of an object in front of the vehicle and generates a visual cue. Additionally, it is noted that the display 118 can include the at least one processor 102 and the at least one memory module 106. In some embodiments, at least a portion of the display 118 may be on the combination meter of the vehicle. In certain embodiments, the system 100 may not include a display 118.

The depicted cue generating system 100 comprises tactile input hardware 120 coupled to the communication path 104 such that the communication path 104 communicatively couples the tactile input hardware 120 to other modules of the cue generating system 100. Using the tactile input hardware 120, the driver/user of the vehicle may be able to input his final destination. The tactile input hardware 120 may be any device capable of transforming mechanical, optical, or electrical signals into a data signal capable of being transmitted with the communication path 104. Specifically, the tactile input hardware 120 may include any number of movable objects that each transform physical motion into a data signal that can be transmitted to over the communication path 104 such as, for example, a button, a switch, a knob, a microphone or the like. In some embodiments, the display 118 and the tactile input hardware 120 are combined as a single module and operate as an audio head unit or an infotainment system. However, it is noted, that the display 118 and the tactile input hardware 120 may be separate from one another and operate as a single module by exchanging signals via the communication path 104. While the cue generating system 100 includes tactile input hardware 120 in the embodiment depicted in FIG. 1, the cue generating system 100 may not include tactile input hardware 120 in other embodiments, such as embodiments that do not include a display 118.

The cue generating system 100 optionally comprises a peripheral tactile input 122 coupled to the communication path 104 such that the communication path 104 communicatively couples the peripheral tactile input 122 to other modules of the cue generating system 100. For example, in one embodiment, the peripheral tactile input 122 is located in a vehicle console to provide an additional location for receiving input. The peripheral tactile input 122 operates in a manner substantially similar to the tactile input hardware 120, i.e., the peripheral tactile input 122 includes movable objects and transforms motion of the movable objects into a data signal that may be transmitted over the communication path 104.

The cue generating system 100 optionally comprises a sound system 128 for providing an audio output, related to navigation, entertainment, information, or a combination thereof. The sound system 128 is coupled to the communication path 104. Accordingly, the communication path 104 communicatively couples the sound system 128 to other modules of the system 100. In some embodiments, the sound system 128 may include any medium capable of transmitting an audio output such as speakers. In embodiments, the sound system 128 may be used to generate an audio cue to the driver of the vehicle as described herein. Some embodiments do not include the sound system 128.

The cue generating system 100 includes a tactile feedback device 130, such as one or more vibration devices. The tactile feedback device 130 is communicatively coupled to the communication path 104. For example, the tactile feedback device 130 that includes one or more vibration devices may be incorporated into a steering wheel or a control knob to generate a vibration cue to the driver of the vehicle as described herein. Some embodiments of the system 100 do not include the tactile feedback device 130.

The cue generating system 100 can be formed from a plurality of modular units, i.e., the at least one object sensor 110, the display 118, tactile input hardware 120, the peripheral tactile input 122, satellite antenna 124, the sound system 128, and the tactile feedback device 130, can be formed as modules that when communicatively coupled form the cue generating system 100. Accordingly, in some embodiments, each of the modules can include one or more of the at least one processor 102 and/or the at least one memory module 106. Accordingly, it is noted that, while specific modules may be described herein as including a processor 102 and/or a memory module 106, the embodiments described herein can be implemented with the processors 102 and memory modules 106 distributed throughout various communicatively coupled modules.

In embodiments where the cue generating system 100 is coupled to a vehicle, the at least one processor 102 executes machine readable instructions to transform the global positioning satellite signals received by the satellite antenna 124 into data indicative of the current location of the vehicle. In this way, a second position and a first position of the vehicle described herein may be obtained by the cue generating system 100.

Figure 2:
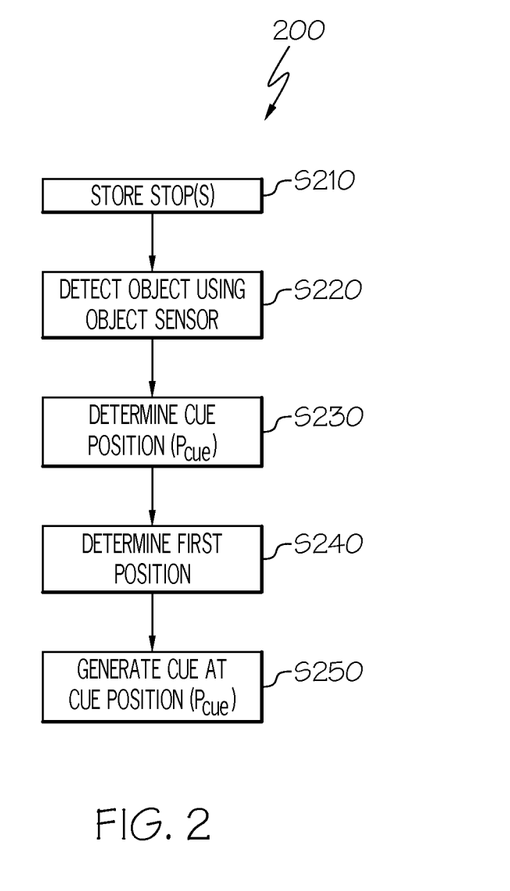
FIG. 2 is a flowchart depicting a method of generating a cue to a driver of a vehicle, according to one or more embodiments shown and described herein.

Referring to FIG. 2, an embodiment of a method 200 for generating a cue to a driver of a vehicle is schematically depicted. In some embodiments, the method 200 may be implemented as logic by the machine readable instructions that, when executed by the at least one processor 102, automatically generate cues to the driver of the vehicle, as discussed below. It is noted that, while the method 200 depicts steps following a specific sequence, additional embodiments of the present disclosure are not limited to any particular sequence.

Referring to FIGS. 1-2, in step S210, the machine readable instructions stored in the at least one memory module 106, when executed by the at least one processor 102, cause the cue generating system 100 to store at least one stop (S) in the at least one memory module 106. In embodiments, the stop (S) is a temporary stop on a route to the final destination. In some embodiments, the vehicle has previously traveled on the route.

Additionally, the cue generating system 100 may also be configured to store at least one stopping position ($S_n$) of the vehicle. The stopping position ($S_n$) is a location the vehicle has previously stopped prior to reaching the at least one stop (S). In some embodiments, the at least one stopping position ($S_n$) is within the distance ($D_S$) from the at least one stop (S). In embodiments, the at least one stopping position ($S_n$) may be stored when the navigation module 114 indicates the presence of the stop (S). In embodiments, when the vehicle stops at the least one stop (S), then the stopping position ($S_n$) and the at least one stop (S) are the same (i.e. Ds=0).

The cue generating system 100 is configured to retrieve the at least one stop (S) stored in the at least one memory module 106. Additionally, the cue generating system 100 may also be configured to retrieve the at least one stopping position ($S_n$) in response to the vehicle being at the minimum threshold distance ($D_o$) from the at least one stop (S).

Referring to FIGS. 1-2, in step S220, the machine readable instructions stored in the at least one memory module 106, when executed by the at least one processor 102, cause the cue generating system 100 to detect the presence of an object based on the output from the at least one object sensor 110. The at least one object sensor 110, when placed on the vehicle, is able to send and receive signals to detect the presence of an object (e.g. another vehicle) in front of the vehicle. The signals may be radar signals, ultrasonic signals, laser signals, or laser radar signals. The at least one object sensor 110 may be configured to determine the difference in the sent signals and received signals, thereby detecting the presence of an object. When an object is detected, the at least one object sensor 110 is configured to convert the received signal and send an output data signal to the cue generating system 100. In embodiments, the presence of an object by the at least one object sensor 110 may also be displayed on the display 118, output through the sound system 128, or indicated with the tactile feedback device 130.

In embodiments, the at least one object sensor 110 is configured to detect whether an object is present in front of the vehicle. In other embodiments, the at least one object sensor 110 is also configured to detect the number of objects present in front of the vehicle.

In embodiments, the cue generating system 100 determines a second position of the vehicle, such that when the second position of the vehicle is at/within the minimum threshold distance ($D_o$) from the stop (S), the at least one object sensor 110 'looks' for objects in front of the vehicle, and transmits the output of the at least one object sensor 110 to the cue generating system 100 via the communication path 104. In embodiments, the data signal indicative of the second position is capable of being transmitted over the communication path 104. The determination of the second position of the vehicle by the cue generating system 100 is based on geographical coordinates or data signals received by the satellite antenna 124. For example, in some embodiments, the satellite antenna 124 may include a chipset that transforms the received electromagnetic signal into a data signal that is transmitted over the communication path 104 and processed by the at least one processor 102. Generally, the data signal indicative of the second position includes a latitude and a longitude. In some embodiments, the data signal indicative of the second position of the vehicle also includes an altitude. In some embodiments, the data signal indicative of the second position may also include a heading and/or a speed, such as when the data signal provided by the chipset includes a heading and/or speed that is associated with the latitude and longitude of the first position of the vehicle. In other embodiments, the data signal indicative of the second position does not include a heading or a speed. Accordingly, in some embodiments, information regarding the second position can be based upon a combination of data including the detected speed, detected heading, detected latitude and longitude, and processing delay.

Still referring to FIGS. 1-2, at step S230, the machine readable instructions stored in the at least one memory module 106, when executed by the at least one processors 102, cause the cue generating system 100 to determine a cue position ($P_{cue}$) for generating a cue, based on the detected presence of the object, and the at least one stop (S) stored in the at least one memory module 106.

For example, in some embodiments, after the at least one object sensor 110 detects the presence of an object in front of the vehicle, the cue generating system 100 is configured to determine an adjusted stopping position ($S_{aj}$) in response to the object detected in front of the vehicle. In some embodiments, the adjusted stopping position ($S_{aj}$) is a predicted location at which the vehicle will stop prior to reaching the at least one stop (S) after taking into account the presence of the object between the vehicle and the at least one stop (S). In embodiments, when the object is detected in front of the vehicle, the cue generating system 100 determines the adjusted stopping position ($S_{aj}$) as a distance ($D_y$) from the at least one stop (S), i.e. the distance ($D_y$) is the distance between the adjusted stopping position ($S_{aj}$) and the at least one stop (S) such that the object may be located within the distance ($D_y$). In embodiments, the distance ($D_y$) may be a car length plus some amount of clearance. After determining the adjusted stopping position ($S_{aj}$), the cue generating system 100 may determine the cue position ($P_{cue}$). The cue position ($P_{cue}$) is the location at which the cue is to be given to the driver of the vehicle. The cue generating system 100 may determine the cue position ($P_{cue}$) based on the speed of the vehicle, and the adjusted stopping position ($S_{aj}$). In embodiments when an object has been detected, the cue position ($P_{cue}$) may be determined to be the location at which the vehicle is at a distance ($D_x$) from the adjusted stopping position ($S_{aj}$). In embodiments when no object has been detected, the cue position ($P_{cue}$) may be determined to be the location at which the vehicle is at a distance ($D_x$) from the at least one stop (S) or the at least one stopping position ($S_n$). In embodiments in which the cue position ($P_{cue}$) may be determined based on the speed of the vehicle, the distance ($D_x$) may be a function of speed, such that $D_x$ is greater at higher speeds, and smaller at lower speeds.

For example, when the at least one object sensor 110 detects no objects in front of the vehicle when the second position of the vehicle is at/within the minimum threshold distance ($D_o$) from the at least one stop (S), the at least one stop (S) is retrieved from the at least one memory module 106. Further, the cue generating system 100 determines that because no object has been detected, the vehicle may stop at the at least one stop (S) (i.e. no adjusted stopping position ($S_{aj}$) is required). The cue generating system 100 is then configured to determine the cue position ($P_{cue}$) based on the speed of the vehicle, and the at least one stop (S). In some embodiments, the cue position ($P_{cue}$) is determined to be a distance ($D_x$) from the at least one stop (S), where $D_x$ is calculated as a function of speed.

However, when the at least one object sensor 110 detects the presence of an object in front of the vehicle, in response to the second position of the vehicle being at/within the minimum threshold distance ($D_o$) from the at least one stop (S), an adjusted stopping position ($S_{aj}$) is determined by the cue generating system 100. In some embodiments, the adjusted stopping position ($S_{aj}$) is calculated to be a distance ($D_y$) from the at least one stop (S). In some embodiments, the distance ($D_x$) is calculated from the adjusted stopping position ($S_{aj}$) to determine the cue position ($P_{cue}$) to generate a cue to the driver of the vehicle. In embodiments, the distance ($D_x$) is calculated based on the speed of the vehicle as described above.

By way of example, when an object is detected in front of the vehicle, the cue position ($P_{cue}$) will be determined to be further from the stop (S), as compared to when no object is detected, in which case the cue position ($P_{cue}$) will be closer to the stop (S). Similarly, when the vehicle is traveling at a higher speed, the cue position (P 1 will be farther from the at least one stop (S) (i.e. the cue will be generated earlier), as compared to when the vehicle is traveling at a slower speed, in which case the cue position ($P_{cue}$) will be closer to the stop (S) (i.e. the cue will be generated later).

Referring to FIG. 2, at step S240, the machine readable instructions stored in the at least one memory module 106, when executed by the at least one processor 102, cause the cue generating system 100 to determine the first position of the vehicle. In some embodiments, the determination of the first position of the vehicle may be made after the cue position ($P_{cue}$) has been calculated. The first position may be determined based on geographical coordinates or data signals received by the satellite antenna 124, as described above (with respect to the second position).

As shown in FIG. 1-2, at step S250, the machine readable instructions stored in the at least one memory module 106, when executed by the at least one processor 102, cause the cue generating system 100 to generate the cue based on the first position and the cue position ($P_{cue}$). In embodiments, when the system determines that the first position of the vehicle is the cue position ($P_{cue}$) (i.e. first position=$P_{cue}$), the cue generating system 100 generates the cue. In some embodiments, when the geographical coordinates of the first position are the same as the geographical coordinates of the cue position ($P_{cue}$), the cue generating system 100 generates the cue. In other embodiments, the cue generating system 100 generates the cue when the vehicle is a threshold distance from the cue position ($P_{cue}$).

The cue is a prompt or an indication to the driver to coast (e.g. to take his or her foot off the acceleration pedal) to the at least one stop (S) to improve the regenerative braking and fuel economy. In embodiments, the cue may be generated within the vehicle, and may be in the form of an audio cue, a visual cue or a vibration. In certain embodiments, the driver may be able to select the type of cue preferred (e.g. by providing the input with the tactile input hardware 120 or the peripheral tactile input hardware 122). To generate the cue, the cue generating system 100 may use the one or more components of the system 100. For example, an audio cue may be generated using the vehicle's existing sound system 128, a visual cue may be generated using the display 118, or a steering wheel of the vehicle may be made to vibrate using the tactile feedback device 130 to cue the driver.

In alternative embodiments, the cue may be generated based on a time it would take the vehicle to approach the cue position ($P_{cue}$) from the second position of the vehicle. The time may be calculated based on the speed of the vehicle at the second position, and a distance between the second position of the vehicle and the adjusted stopping position ($S_{aj}$) (when an object has been detected), or the at least one stop (S) (when no object has been detected).

Figure 3A:
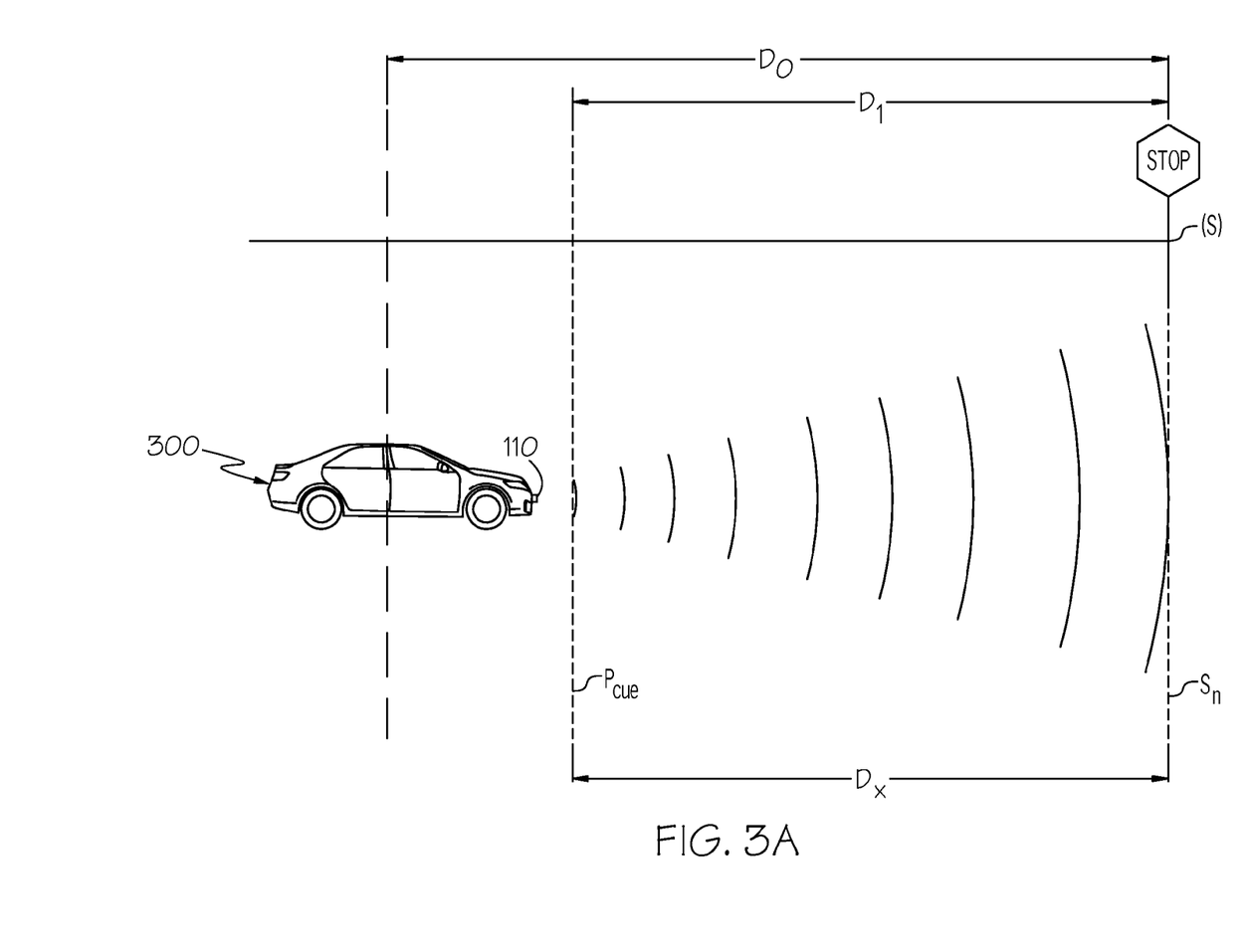
FIG. 3A depicts a cue position ($P_{cue}$) at which a driver of a vehicle is provided a cue when there are no objects detected by the object sensor in front of the vehicle, according to one or more embodiments shown and described herein.
Figure 3B:
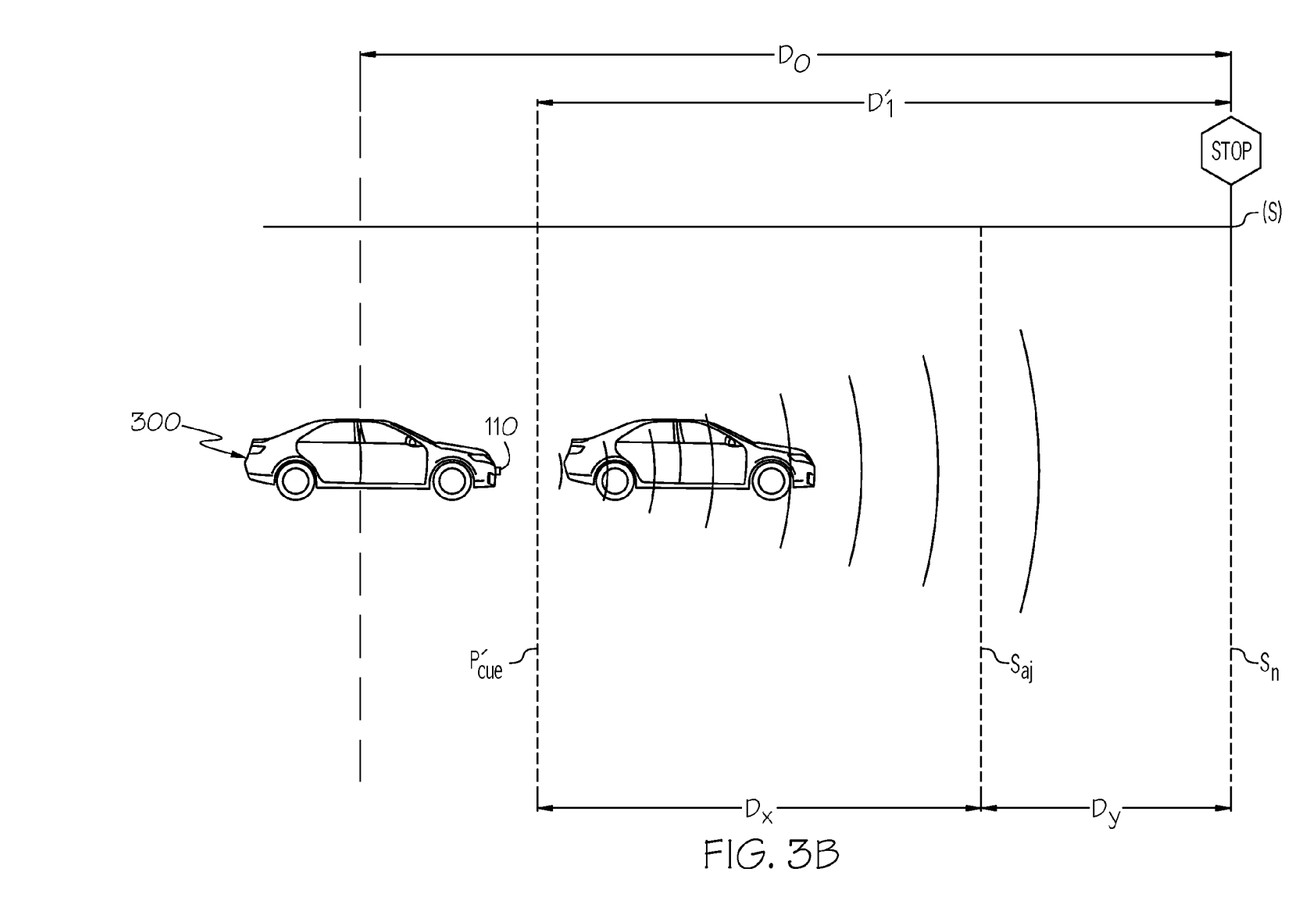
FIG. 3B depicts an adjusted cue position ($P'_{cue}$), at which a driver of a vehicle is provided a cue when an object is detected by the object sensor in front of the vehicle.

To further exemplify the operations of the cue generating system 100, referring to FIG. 3A, a vehicle 300 is shown with the at least one object sensor 110 placed on the vehicle 300 approaching the at least one stop (S). When the second position (or current position) of the vehicle 300 is at the minimum threshold distance ($D_o$) from the at least one stop (S), the at least one object sensor 110 determines whether an object is in front of the vehicle, and retrieves the at least one stop (S) of the vehicle from the at least one memory module 106. As shown in FIG. 3A, no object is present in front of the vehicle. The cue generating system 100 determines the cue position ($P_{cue}$) based on the determination that no object is present in front of the vehicle 300. The cue position ($P_{cue}$) may be calculated based on the speed of the vehicle, and the at least one stop (S), as described above. In the embodiment in FIG. 3A, the cue position ($P_{cue}$) is determined to be a distance ($D_x$) from the at least one stop (S). As shown in FIG. 3A, $D_1=D_x$. When an updated position (or first position) of the vehicle is the cue position ($P_{cue}$), the cue generating system 100 generates the cue.

However, as shown in FIG. 3B, when the at least one object sensor 110 detects an object in front of the vehicle 300 in response to the second position (or current position) of the vehicle 300 being at/within the minimum threshold distance ($D_o$) from the at least one stop (S), the cue generating system 100 determines an adjusted stopping position ($S_{aj}$). The adjusted stopping position ($S_{aj}$) is determined to be a distance ($D_y$) from the at least one stop (S), such that when the vehicle stops at the adjusted stopping position ($S_{aj}$), the object (e.g. another vehicle) is within the distance ($D_y$). Further, the cue generating system 100 determines the cue position ($P'_{cue}$), (which is an adjusted cue position as compared to FIG. 3A) based on the speed of the vehicle 300, and the adjusted stopping position ($S_{aj}$), as described above. The cue position ($P'_{cue}$) as shown in FIG. 3B is determined to be a distance ($D_x$) from the adjusted stopping position ($S_{aj}$). As shown in FIG. 3B, $D'_1$ is the distance from the cue position ($P'_{cue}$) to the at least one stop (S), where $D'_1=D_x+D_y$. When an updated position (or first position) of the vehicle 300 is the cue position ($P'_{cue}$), the cue generating system 100 generates the cue.

As a comparison between FIGS. 3A and 3B, the cue position ($P_{cue}$) in FIG. 3A is at a distance $D_1$ from the at least one stop (S) such that $D_1=D_x$ because no object has been detected by the at least one object sensor 110. In contrast, as shown in FIG. 3B, when there is an object detected by the at least one object sensor 110, the cue position ($P'_{cue}$) is at the distance $D'_1$ from the at least one stop (S), where $D'_1=D_x+D_y$. As can be seen in FIG. 3B, the cue position ($P'_{cue}$)$_{is}$ is further from the at least one stop (S) as compared to the cue position ($P_{cue}$) in FIG. 3A, which is closer to the at least one stop (S), such that the cue will be given earlier in FIG. 3B to account for the predicted earlier stop.

It should be understood that the embodiments disclosed herein include systems, methods, and vehicles for generating cues to drivers at cue positions that detect the presence of an object in front of the vehicle based on the output of the at least one object sensor 110, determine the cue position ($P'_{cue}$) for generating the cue based on the presence of the object detected and the at least one stop (S), determine a first position of the vehicle, and generate the cue to the driver of the vehicle based on the first position and the cue position ($P_{cue}$). The cue given to the driver of the vehicle at the cue position ($P_{cue}$) is an indication to the driver to begin coasting at the cue position ($P_{cue}$). By providing a cue to begin coasting, regenerative braking may be enhanced and fuel economy may be improved. Furthermore, when an object, such as another vehicle is detected in front of the vehicle 300, the cue position may be adjusted to account for the object thereby providing enhanced regenerative braking and improved fuel economy.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A system for generating a cue to a driver of a vehicle comprising:
   at least one processor;
   at least one memory module communicatively coupled to the at least one processor;
   at least one stop (S) stored in the at least one memory module, wherein the at least one stop (S) includes a location at which the vehicle has previously stopped;
   at least one object sensor communicatively coupled to the at least one processor; and
   machine readable instructions stored in the at least one memory module that cause the system to perform at least the following when executed by the at least one processor:
      detect whether an object is present in front of the vehicle based on an output of the at least one object sensor;
      determine a cue position ($P_{cue}$) for generating the cue based on the location of the at least one stop (S) in response to detecting that no object is present in front of the vehicle;
      determine an adjusted cue position ($P'_{cue}$) for generating the cue based on the location of the at least one stop (S) in response to detecting that the object is present in front of the vehicle, wherein the adjusted cue position ($P'_{cue}$) is further from the at least one stop (S) as compared to the cue position ($P_{cue}$);
      determine a first position of the vehicle;
      generate the cue to the driver of the vehicle when the first position is the cue position ($P_{cue}$) and no object is detected as present in front of the vehicle; and
      generate the cue to the driver of the vehicle when the first position is the adjusted cue position ($P'_{cue}$) and the object is detected as present in front of the vehicle.

2. The system of claim 1, further comprising at least one stopping position ($S_n$) of the vehicle stored in the at least one memory module, wherein the at least one stopping position ($S_n$) is a location the vehicle has previously stopped prior to reaching the at least one stop (S), wherein the at least one stopping position ($S_n$) is within a distance ($D_S$) of the at least one stop (S).

3. The system of claim 2, wherein the machine readable instructions stored in the at least one memory module further cause the system to perform at least the following when executed by the at least one processor:
   retrieve the at least one stopping position ($S_n$) from the at least one memory module in response to the vehicle being a minimum threshold distance ($D_o$) from the at least one stop (S).

4. The system of claim 2, wherein the cue position ($P_{cue}$) is determined to be a distance ($D_x$) from the at least one stopping position ($S_n$) in response to the at least one object sensor detecting no object within a minimum threshold distance ($D_o$), wherein the distance ($D_x$) is based on a speed of the vehicle.

5. The system of claim 1, wherein the machine readable instructions stored in the at least one memory module further cause the system to perform at least the following when executed by the at least one processor:
   determine a second position of the vehicle; and
   detect whether the object is present in front of the vehicle in response to determining that the second position of the vehicle is within a minimum threshold distance ($D_o$) of the at least one stop (S).

6. The system of claim 1, wherein the machine readable instructions stored in the at least one memory module further cause the system to perform at least the following when executed by the at least one processor:
   determine an adjusted stopping position ($S_{aj}$) in response to the at least one object sensor detecting the object in front of the vehicle, wherein the adjusted stopping position ($S_{aj}$) is a distance ($D_y$) from the at least one stop (S).

7. The system of claim 6, wherein the machine readable instructions stored in the at least one memory module further cause the system to perform at least the following when executed by the at least one processor:
   determine the adjusted cue position ($P'_{cue}$) based on a speed of the vehicle, and the adjusted stopping position ($S_{aj}$).

8. The system of claim 7, wherein the adjusted cue position ($P'_{cue}$) is a distance ($D_x$) from the adjusted stopping position ($S_{aj}$).

9. The system of claim 1, wherein the at least one stop (S) is a temporary stop on a route to a final destination, and the route is previously traveled by the vehicle.

10. The system of claim 1, wherein the at least one object sensor is a radar unit, an ultrasonic unit, a camera system, a laser unit, or a laser radar unit.

11. The system of claim 1, wherein the cue is an audio cue, a visual cue, or a vibration.

12. A method for generating a cue to a driver of a vehicle comprising:
   storing at least one stop (S) in at least one memory module wherein the at least one stop (S) includes a location at which the vehicle has previously stopped;
   detecting whether an object is present in front of the vehicle based on an output of at least one object sensor;
   determining a cue position ($P_{cue}$) for generating the cue based on the location of the at least one stop (S) in response to detecting that no object is present in front of the vehicle;
   determining an adjusted cue position ($P'_{cue}$) for generating the cue based on the location of the at least one stop (S) in response to detecting that the object is present in front of the vehicle, wherein the adjusted cue position ($P'_{cue}$) is further from the at least one stop (S) as compared to the cue position ($P_{cue}$);
   determining a first position of the vehicle;
   generating the cue to the driver of the vehicle when the first position is the cue position ($P_{cue}$) and no object is detected as present in front of the vehicle; and generating the cue to the driver of the vehicle when the first position is the adjusted cue position ($P'_{cue}$) and the object is detected as present in front of the vehicle.

13. The method of claim 12, further comprising:
storing at least one stopping position ($S_n$) of the vehicle in the at least one memory module, wherein the at least one stopping position ($S_e$) is a location the vehicle has previously stopped prior to reaching the at least one stop (S), wherein the at least one stopping position ($S_n$) is within a distance ($D_S$) of the at least one stop (S).

14. The method of claim 13, further comprising:
retrieving the at least one stopping position ($S_n$) from the at least one memory module in response to the vehicle being at a minimum threshold distance ($D_o$) from the at least one stop (S).

15. The method of claim 13, wherein the cue position ($P_{cue}$) is determined to be a distance ($D_x$) from the at least one stopping position ($S_n$) in response to the at least one object sensor detecting no object within a minimum threshold distance ($D_o$), wherein the distance ($D_x$) is based on a speed of the vehicle.

16. The method of claim 12, further comprising:
determining a second position of the vehicle; and
detecting whether the object is present in front of the vehicle in response to determining that the second position of the vehicle is within a minimum threshold distance ($D_o$) of the at least one stop (S).

17. The method of claim 12, further comprising:
determining an adjusted stopping position ($S_{aj}$) in response to the at least one object sensor detecting the object in front of the vehicle, wherein the adjusted stopping position ($S_{aj}$) is a distance ($D_y$) from the at least one stop (S).

18. The method of claim 17, further comprising:
determining the adjusted cue position ($P'_{cue}$) based on a speed of the vehicle and the adjusted stopping position ($S_{aj}$).

19. The method of claim 18, wherein the adjusted cue position ($P'_{cue}$) is a distance ($D_x$) from the adjusted stopping position ($S_{aj}$).

20. A vehicle including a system for generating a cue to a driver of the vehicle comprising:
at least one processor;
at least one memory module communicatively coupled to the at least one processor;
at least one stop (S) stored in the at least one memory module, wherein the at least one stop (S) includes a location at which the vehicle has previously stopped;
at least one object sensor communicatively coupled to the at least one processor; and
machine readable instructions stored in the at least one memory module that cause the system to perform at least the following when executed by the at least one processor:
detect whether an object is present in front of the vehicle based on an output of the at least one object sensor;
determine a cue position ($P_{cue}$) for generating the cue based on the location of the at least one stop (S) in response to detecting that no object is present in front of the vehicle;
determine an adjusted cue position ($P'_{cue}$) for generating the cue based on the location of the at least one stop (S) in response to detecting that the object is present in front of the vehicle, wherein the adjusted cue position ($P'_{cue}$) is further from the at least one stop (S) as compared to the cue position ($P_{cue}$);
determine a first position of the vehicle;
generate the cue to the driver of the vehicle when the first position is the cue position ($P_{cue}$) and no object is detected as present in front of the vehicle; and
generate the cue to the driver of the vehicle when the first position is the adjusted cue position ($P'_{cue}$) and the object is detected as present in front of the vehicle.

* * * * *